United States Patent
Aaron et al.

(10) Patent No.: US 9,071,604 B2
(45) Date of Patent: *Jun. 30, 2015

(54) METHODS, SYSTEMS, AND COMPUTER PROGRAM PRODUCTS FOR INVOKING TRUST-CONTROLLED SERVICES VIA APPLICATION PROGRAMMING INTERFACES (APIS) RESPECTIVELY ASSOCIATED THEREWITH

(71) Applicant: AT&T Intellectual Property I, L.P., Reno, NV (US)

(72) Inventors: Jeffrey A. Aaron, Atlanta, GA (US); Edgar Vaughan Shrum, Jr., Smyrna, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/769,568

(22) Filed: Feb. 18, 2013

(65) Prior Publication Data

US 2013/0167197 A1   Jun. 27, 2013

Related U.S. Application Data

(63) Continuation of application No. 11/315,865, filed on Dec. 22, 2005, now Pat. No. 8,380,979.

(51) Int. Cl.
*G06F 7/04* (2006.01)
*H04L 29/06* (2006.01)

(52) U.S. Cl.
CPC ............. *H04L 63/10* (2013.01); *H04L 63/1416* (2013.01); *H04L 63/168* (2013.01)

(58) Field of Classification Search
CPC .... H04L 63/10; H04L 63/168; H04L 63/1416
USPC .......................................................... 726/3
See application file for complete search history.

(56) References Cited

U.S. PATENT DOCUMENTS

| 7,072,691 | B2 | 7/2006 | Cromer et al. | 455/558 |
| 7,366,901 | B2 | 4/2008 | Hapamas et al. | 713/168 |
| 8,166,531 | B2 | 4/2012 | Suzuki | 726/9 |
| 2003/0126435 | A1 | 7/2003 | Mizell et al. | 713/168 |
| 2005/0138127 | A1* | 6/2005 | Jain | 709/206 |
| 2008/0005562 | A1* | 1/2008 | Sather et al. | 713/168 |

FOREIGN PATENT DOCUMENTS

WO   WO 2007069176 A2 *  6/2007

* cited by examiner

*Primary Examiner* — Mohammad W Reza
(74) *Attorney, Agent, or Firm* — Myers Bigel Sibley & Sajovec, PA

(57) ABSTRACT

A trust evaluation may be obtained for a network element in a communication network. Based on this trust evaluation, one or more services may be invoked to address the risk that a potentially untrustworthy network element poses in the communication network. Application programming interfaces (APIs) may automate the invocation of trust-controlled services. An API for a trust-controlled service may be used to directly perform a function on one or more resources in the communication network or may be used to set up an ongoing function on one or more resources in the communication network that may continue until the API is used to terminate the function.

20 Claims, 9 Drawing Sheets

API Parameters for (TC-Controlled Mirroring)

- Request / select / enable mirroring
- Permanency
  - Until otherwise commanded
  - For a given time period, or until a particular event occurs
- Select or set preference for mirroring method
  - Full
  - Sampled (w/ sampling time interval or packet percent)
- Traffic to be mirrored
  - Source IP address
  - Port
  - VLAN / VPN
  - ATM PVC or Frame Relay connection / MPLS label-switched path
- Mirror output
  - Port
  - VLAN / VPN
  - VLAN / ATM PVC or Frame Relay connection / MPLS label-switched path

*FIG. 4*

API Parameters for (TC-Controlled Monitoring, Examination, Blocking)

- Request / select / enable monitoring, examination, or both
- Select or set preference for location/site of monitoring; location/site of examination
  - Host / processor
  - Other resource, e.g. network resource / equipment / data center
- Type of monitoring; type of examination
  - Class or method
  - Rules or Set (e.g., Rule Set # N)
  - Pattern Match or Set (e.g., Pattern Match Set # M)
  - Deviation from expected value or Set (e.g., Deviation Set # D)
- Depth of monitoring; depth of examination (e.g., to directly select, or set maximum and/or minimum)
  - Time / extent
  - # of stages
  - # of associations / nesting / degree of statefulness
- Blocking
  - On/off, or allowed/not-allowed
  - Temporary (w/ time extent) or permanent (until further notice)
  - What to block (filtering by full or partial N-tuple, payload data signature triggered, etc.)
- Human interaction
  - On/off, or allowed/not-allowed
  - Type
  - Trigger events and/or scheduled time after start
- Adaptation (e.g., to select or allow)
  - Adjustment type (e.g., rule, parameter, threshold used, etc.)
  - Degree of adjustment (e.g., units / step size / # of steps, and/or value of change)

*FIG. 5*

API Parameters for (TC-Controlled Storage & Logging)

- Request / select / enable storage, or logging, or both
- Select or set preference for storage method; logging method
  - Full
  - Sampled (w/ sampling time interval or packet percent)
- Traffic to be stored; logged
  - Source IP address
  - Full or subset of N-tuple (source/destination IP address and/or ports, protocol # or type)
  - Data payload signature trigger (e.g., detected via DPI, Deep Packet Inspection)
- Storage location; logging location
  - Port
  - Labeled path
  - VPN
  - VLAN
  - Destination IP address
- Data security
  - Encryption on/off
  - Encryption method / algorithm / mode
  - Key length / key value
  - Key escrow method

*FIG. 6*

API Parameters for (TC-Controlled Traffic Endpoint / Midpoint Selection)
- Request / select / enable endpoint selection and/or midpoint selection
  - Endpoint
  - Midpoint
  - Both
- Select or set preference for selection method
  - Assigned
  - Requested
- Traffic to be affected
  - Source IP address
  - Port
  - VLAN / ATM PVC or Frame Relay connection / MPLS label-switched path
  - Full or subset of N-tuple (source/destination IP address and/or ports, protocol # or type)
  - Data payload signature trigger (e.g., detected via DPI, Deep Packet Inspection)
- Endpoint; Midpoint selection info, and/or inclusion criteria (e.g., point must include the designated port, path, etc.)
  - Port
  - VPN / VLAN / MPLS labeled path / ATM / Frame Relay connection
  - IP address
  - Node #
- Detection avoidance
  - On/off
  - Detection avoidance parameters (e.g., latency or delay required, spoofing of addresses, etc.)
  - Probing and tweaking
    - On/off
    - Frequency / interval

*FIG. 7*

API Parameters for (TC-Controlled Secure Tunneling)
- Request / select / enable tunneling
- Tunnel type
  - IPsec
  - SSL
  - MPLS / Frame Relay / ATM / VLAN
- Security mechanisms
  - Authentication
  - Encryption
  - Message signing / non-repudiation
  - Message integrity protection
- Security parameters
  - Method / version
  - Algorithm / mode
  - Key length / key value / key update rate or interval or frequency
- Endpoints
  - Initiator (begins set-up and tear down), identified by IP address / port / node ID / etc.
  - End (completes set-up and tear down), identified by IP address / port / node ID / etc.
- Tunnel monitoring
  - Method & depth
  - Intensity / frequency
- Tunnel filtering
  - Full or subset of N-tuple (source/destination IP address and/or ports, protocol # or type) + block / discard or allow
- Tunnel routing
  - Full or subset of N-tuple (source/destination IP address and/or ports, protocol # or type) + route through tunnel or don't

*FIG. 8*

API Parameters for (TC-Controlled App Triggering and Control)
- Request / select / enable application triggering and control
- Application (to control, or be controlled)
  - Firewall
  - Anti-virus / spy-ware / spam
  - Operating system
  - Email / instant messaging
  - Peer-to-peer (P2P)
  - Shared application, e.g. calendaring
  - Game
- Parameter (to control, or be controlled)Firewall

| | | |
|---|---|---|
| Network zone(s), full or partial N-tuple filtering, state mode | <==> | firewall |
| Mode, scan targets, depth of scanning / nesting / persistence | <==> | anti-virus / spy-ware / spam |
| Secure file / folder storage, authentication, other security-related functions | <==> | operating system |
| Method of conveyance, degree of security employed, sender and/or recipients allowed messaging | <==> | email / instant |
| Mode, speed of downloads, allowed download/communication sites | <==> | peer-to-peer (P2P) |
| Filtering, to share or not and to what degree, privacy methods calendaring | <==> | shared app, e.g. |
| Resolution, features, info sharing allowed | <==> | game |

- Value of Parameter
  - Absolute (e.g., to which it will be set, incremented / decremented, or limited as a maximum / minimum)
  - Relative (e.g., to which it will be set, incremented / decremented, or limited as a maximum / minimum)
- Query
  - For parameter value
  - For controllable parameter
  - For controllable application

*FIG. 9*

METHODS, SYSTEMS, AND COMPUTER PROGRAM PRODUCTS FOR INVOKING TRUST-CONTROLLED SERVICES VIA APPLICATION PROGRAMMING INTERFACES (APIS) RESPECTIVELY ASSOCIATED THEREWITH

RELATED APPLICATION

This application is a continuation of U.S. application Ser. No. 11/315,865, filed Dec. 22, 2005, the disclosure of which is hereby incorporated herein by reference as if set forth in its entirety.

FIELD OF THE INVENTION

The present invention relates generally to application programming interfaces (APIs), and, more particularly, to methods, systems, and computer program products for using APIs in communication networks.

BACKGROUND OF THE INVENTION

In a communication network, one or more network elements may be modified in an undesirable fashion, which may result in these network elements being considered untrustworthy or perhaps even a security risk. Various services may be invoked or actions taken to address the untrustworthy element(s) so as to reduce the potential for harm resulting from such things as hacker activity, software viruses, and the like. Invocation of these various services, however, may involve human intervention in which the response times are measured in terms of minutes, hours, or even days during which time the events of interest may no longer be present.

SUMMARY OF THE INVENTION

According to some embodiments of the present invention, a trust evaluation is obtained for a network element in the communication network. A service is invoked in response to the trust evaluation for the network element via an application programming interface (API) associated with the service.

In other embodiments of the present invention, invoking the service comprises invoking the service via the API associated with the service to directly perform a function on at least one resource in the communication network.

In still other embodiments of the present invention, invoking the service comprises invoking the service via the API associated with the service to set up an ongoing function on one or more resources in the communication network.

In still other embodiments of the present invention, the service comprises a traffic mirroring service for the network element, a traffic monitoring service for the network element, a traffic examination service for traffic associated with the network element, a traffic blocking service for traffic associated with the network element, a traffic storage service for traffic associated with the network element, a traffic logging service for traffic associated with the network element, an endpoint resource selection service for traffic associated with the network element, a midpoint selection service for traffic associated with the network element, a tunneling service for traffic associated with the network element, and/or an application management service for the network element.

In still other embodiments of the present invention, the service comprises the traffic mirroring service, and the API associated with the traffic mirroring service comprises at least one of the following parameters: mirroring permanency, mirror full traffic, mirror sample traffic, traffic source IP address, traffic port, traffic protocol, mirror output port, and mirror output protocol.

In still other embodiments of the present invention, the service comprises the traffic monitoring service, traffic examination service, and traffic blocking service for the network element, and the API associated with the traffic monitoring service, traffic examination service, and traffic blocking service for the network element comprises at least one of the following parameters: monitoring location, type of monitoring/examination, depth of monitoring/examination, blocking status, blocking traffic filter, human interaction indication, and adaptation information.

In still other embodiments of the present invention, the service comprises the traffic storage service and the traffic logging service for traffic associated with the network element, and the API associated with the traffic storage service and the traffic logging service for traffic associated with the network element comprises at least one of the following parameters: store/log full traffic, store/log traffic samples, traffic source IP address, traffic destination IP address, traffic port, traffic protocol, storing/logging location, port associated with the location, protocol associated with the location, and encryption information.

In still other embodiments of the present invention, the service comprises the endpoint resource selection service and the midpoint selection service for traffic associated with the network element, and the API associated with the endpoint resource selection service and the midpoint selection service for traffic associated with the network element comprises at least one of the following parameters: endpoint identification, midpoint identification, request for midpoint/endpoint, assign midpoint/endpoint, traffic source IP address, traffic destination IP address, traffic port, traffic protocol, midpoint/endpoint port, midpoint/endpoint protocol, midpoint/endpoint node number, and detection avoidance information.

In still other embodiments of the present invention, the service comprises the tunneling service for traffic associated with the network element, and the API associated with the tunneling service for traffic associated with the network element comprises at least one of the following parameters: tunnel type, security information, endpoint identification, monitoring method information, and traffic filter information for the tunnel.

In still other embodiments of the present invention, the service comprises the application management service for the network element, and the API associated with the application management service for the network element comprises at least one of the following parameters: application identity, variable associated with the application, value associated with the variable, application query, variable query, and value query.

In still other embodiments of the present invention, a result of invoking the service is verified and a determination is made whether to invoke an alert/alarm based on the verification of the result.

In still other embodiments of the present invention, the result is logged in an information repository.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.
}

BRIEF DESCRIPTION OF THE DRAWINGS

Other features of the present invention will be more readily understood from the following detailed description of exemplary embodiments thereof when read in conjunction with the accompanying drawings, in which:

FIGS. 4-9 illustrate exemplary APIs for trust-controlled services in accordance with some embodiments of the present invention.

DETAILED DESCRIPTION OF EXEMPLARY EMBODIMENTS

Figure 1:
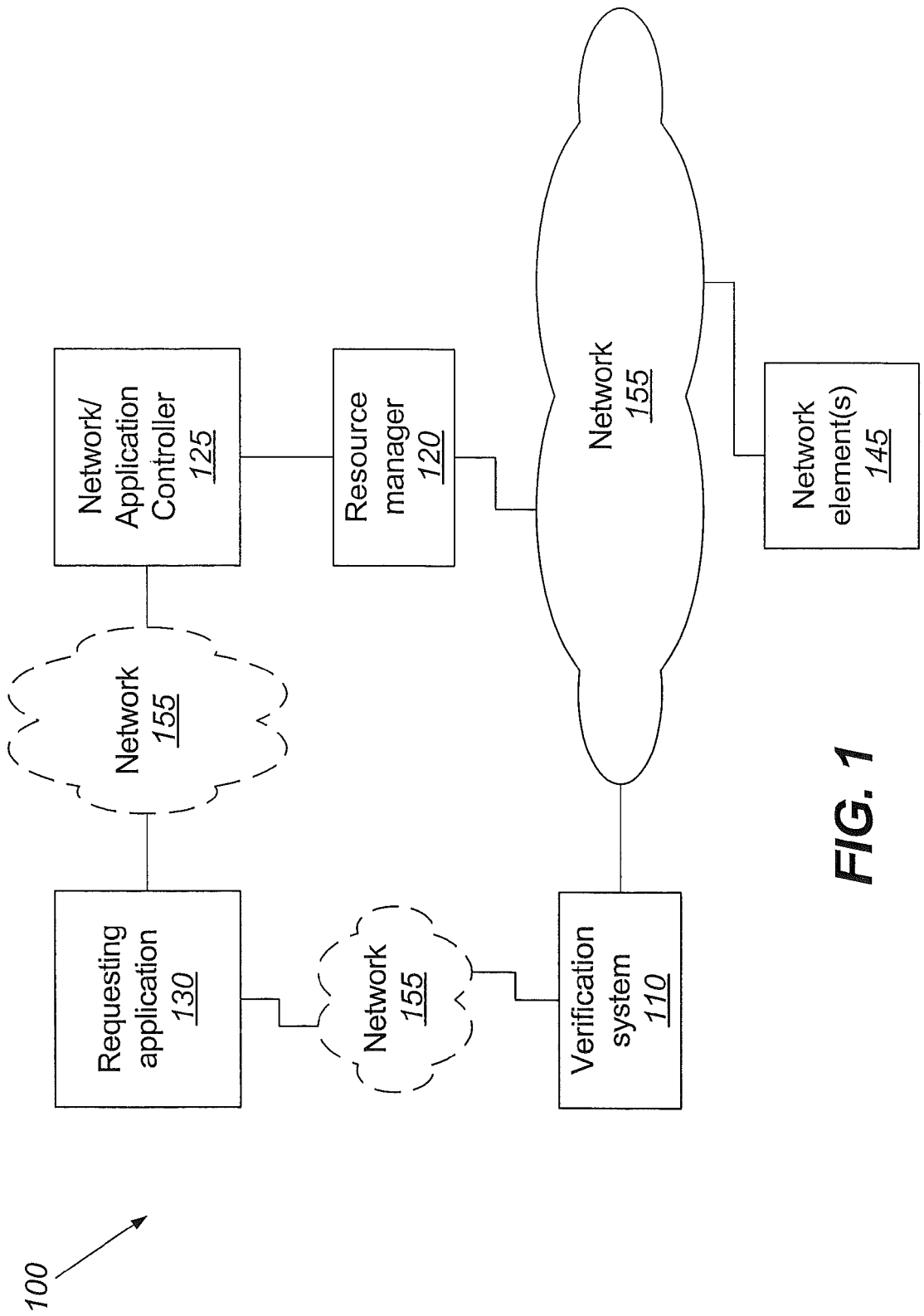
FIG. 1 is a block diagram that illustrates a communication network in accordance with some embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The present invention is described herein with reference to flowchart and/or block diagram illustrations of methods, systems, and computer program products in accordance with exemplary embodiments of the invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Some embodiments of the present invention stem from a realization that a trust evaluation may be obtained for a network element in a communication network. Based on this trust evaluation, one or more services may be invoked to address the risk that a potentially untrustworthy network element poses in the communication network. For example, if the network element is determined to be untrustworthy, then the communication network may be at risk for increased hacker activity, virus infection, traffic errors, and the like. The process of invoking such services may involve human intervention in which response times are measured in minutes, hours, or even days. Unfortunately, the event(s) of interest may no longer be present due to the potentially lengthy response time. Advantageously, some embodiments of the present invention provide application programming interfaces (APIs) to automate the invocation of trust-controlled services, such as a traffic mirroring service for a network element, a traffic monitoring service for a network element, a traffic examination service for traffic associated with a network element, a traffic blocking service for traffic associated with a network element, a traffic storage service for traffic associated with a network element, a traffic logging service for traffic associated with a network element, an endpoint resource selection service for traffic associated with a network element, a midpoint selection service for traffic associated with a network element, a tunneling service for traffic associated with a network element, and/or an application management service for a network element. In accordance with various embodiments of the present invention, an API for a trust-controlled service may be used to directly perform a function on one or more resources in the communication network or may be used to set up an ongoing function on one or more resources in the communication network that may continue until the API is used to terminate the function. The APIs for the various trust-controlled services have particular parameters that are associated therewith as described below. A requesting system or process may call an API with an appropriate set of parameters to invoke a trust-controlled service to perform a desired function.

Referring now to FIG. 1, an exemplary network architecture 100, in accordance with some embodiments of the present invention, comprises a verification system 110, a resource manager 120, a network/application controller 125, a requesting application 130, network element(s) 145, and a communication network 155 that are connected as shown. The network 155 may represent a global network, such as the Internet, and/or other publicly accessible network. The network 155 may also, however, represent a wide area network, a local area network, an Intranet, and/or other private network, which may not accessible by the general public. Furthermore, the network 155 may represent a combination of public and private networks or a virtual private network (VPN). The requesting application 130 may be directly connected to the network/application controller 125 and verification system 110 or may be connected via the network 155.

The verification system 110 may be configured to determine whether a network element 145 is trustable or not, by, for example, determining a degree of trust for the network element 145. The verification system 110 may be embodied as described in, for example, U.S. patent application Ser. No. 10/880,249 entitled "Verification of Consumer Equipment Connected to Packet Networks Based on Hashing Values" (hereinafter '249 application), and U.S. patent application Ser. No. 10/886,169 entitled "Controlling Quality of Service and Access in a Packet Network Based on Levels of Trust for Consumer Equipment" (hereinafter '169 application), the disclosures of which are hereby incorporated herein by reference in their entireties.

Figure 2:
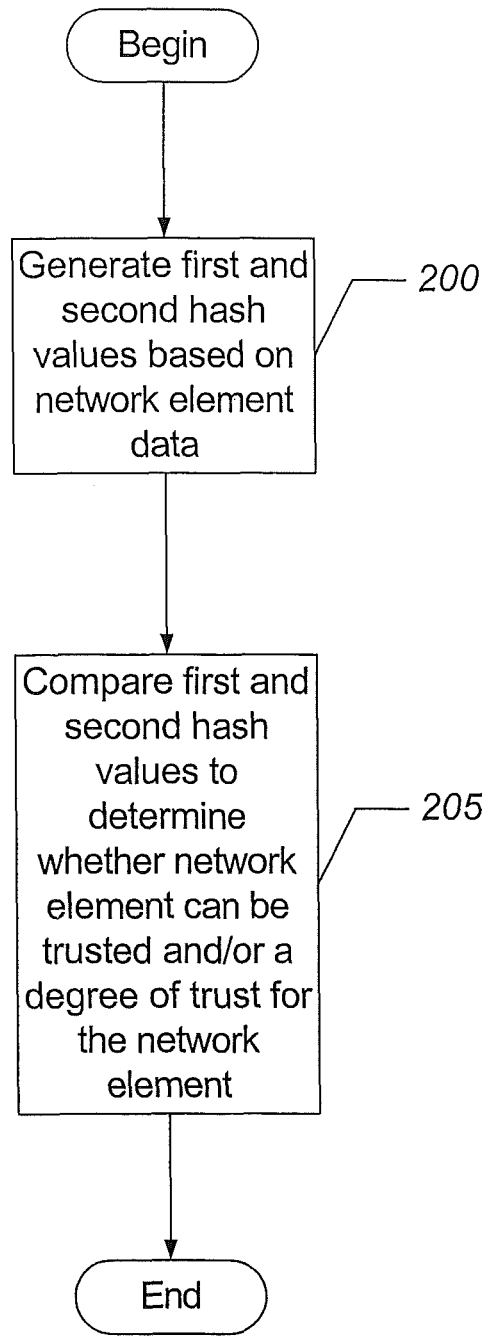
FIGS. 2 and 3 are flowcharts that illustrate operations for invoking trust-controlled services using application programming interfaces (APIs) respectively associated therewith in accordance with some embodiments of the present invention.

Referring to FIG. 2, as described in the '249 application and '169 application, the verification system 110 can determine a level of trust for the network element 145 by generating first and second hash values based on data that is associated with the network element 145 at block 200. This data may represent any type of software and/or firmware, for example, associated with the network element 145. If the hash values are not identical as determined by a comparison made at block 205, then an evaluation may be made to determine whether the network element 145 can be trusted and/or what degree of trust may be assigned to the network element 145 based on the apparent modification of the data as indicated by the non-identical hash values. Hashing of the data may include repetitively hashing nested portions of the data to generate a plurality of hash values. Nested hashing may be used, for example, to identify what portion of the data has changed. This could be done by generating first and second hashes of a grouped or collected set of portion(s) of the data, and, if any change were noted via differences in the first and second hash values, then subsequent checks of subsets of that set could be likewise checked to determine the specific subset containing the change. Further subsets of that subset could then be checked, and so on until the specific portion containing the change is determined. In accordance with various embodiments of the present invention, other techniques of determining trust of a network element may also be used and/or additional inputs may be obtained that provide an indication of the trustworthiness of a network element.

Returning to FIG. 1, as used herein, the term "network element" includes any device that is configured to communicate traffic, such as packet traffic, using the communication network 155. Accordingly, the network element 145 may be, but is not limited to, a router, a gateway, a switching device, a cable modem, a digital subscriber line modem, a public switched telephone network modem, a wireless local area network modem, a wireless wide area network modem, a computer with a modem, a mobile terminal such as personal data assistant and/or cellular telephone with a modem. For network elements that communicate via the communication network 155 through a wireless interface, wireless protocols, such as, but not limited to, the following may be used: a cellular protocol (e.g., General Packet Radio System (GPRS), Enhanced Data Rates for Global Evolution (EDGE), Global System for Mobile Communications (GSM), code division multiple access (CDMA), wideband-CDMA, CDMA2000, and/or Universal Mobile Telecommunications System (UMTS)), a wireless local area network protocol (e.g., IEEE 802.11), a Bluetooth protocol, another RF communication protocol, and/or an optical communication protocol.

The requesting application 130 may be configured to obtain trust and/or degree of trust information for network elements 145 from the verification system 110. In some embodiments, trust-relevant information from additional sources could alternately or additionally be considered. Such additional trust-relevant sources may include, but are not limited to, various network management systems, policy-based control systems, monitoring systems, including intrusion detection/protection systems, security scanning systems, third party security notification systems, outsourced security consulting/management services/systems, and/or security relevant information aggregation systems.

The network/application controller 125 may be configured to expose APIs for one or more trust-controlled services to the requesting application 130. The network/application controller 125 may authenticate valid requests, communicate valid requests to the resource manager 120, and provide a positive or negative acknowledgement to the requesting application 130.

The resource manager 120 may be invoked to respond to, for example, the potential risk posed by the untrustworthiness of one or more network elements 145. In accordance with various embodiments of the present invention, the resource manager 120 may provide one or more of the following trust-controlled services: a traffic mirroring service for the network element, a traffic monitoring service for the network element, a traffic examination service for traffic associated with the network element, a traffic blocking service for traffic associated with the network element, a traffic storage service for traffic associated with the network element, a traffic logging service for traffic associated with the network element, an endpoint resource selection service for traffic associated with the network element, a midpoint selection service for traffic associated with the network element, a tunneling service for traffic associated with the network element, and/or an application management service for the network element.

Figure 3:
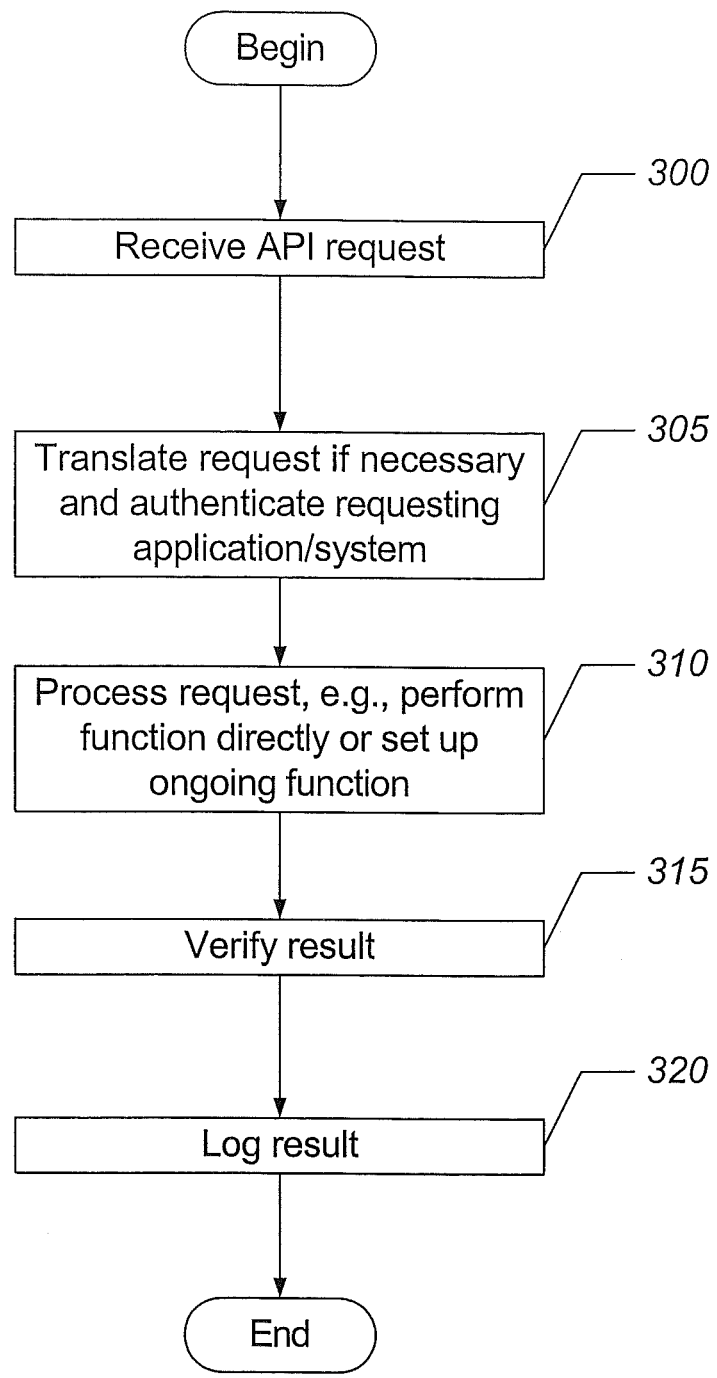

Referring now to FIG. 3, exemplary operations for invoking a trust-controlled service via an API associated therewith begin at block 300 where the network/application controller 125 receives an API request from a requesting application 130. The network/application controller 125 translates the API request as needed, e.g., if the API request is in a different format than that used by the resource manager 120, and authenticates the request as being valid and/or from an authorized requesting application 130 at block 305. The network/application controller 125 communicates the API request to the resource manager 120, which configures the relevant resources/network elements 145 in the communication network 155 to invoke the request trust-controlled service at block 310. The trust-controlled service may be invoked via the API request to directly perform a function on one or more resources in the communication network or the API request may be used to set up an ongoing function on one or more resources in the communication network that may continue until the API is used to terminate the function.

The network/application controller 125 may verify the results of the API request obtained from the resource manager 120 at block 315 and invoke any alerts/alarms as necessary if the API request fails or generates unexpected/undesired results. The network/application controller 125 may also log the results in a local and/or centralized information repository at block 320.

Exemplary trust-controlled services that may be invoked via the resource manager 120 through APIs associated therewith, respectively, are described below in accordance with some embodiments of the present invention.

A traffic mirroring service, for example, may determine what aspects of the traffic associated with the network element (e.g., headers, particular sessions, payloads, etc.) should be mirrored and to which entities the mirrored traffic should be directed (e.g., local authorities, FBI, Homeland Security, etc.) based on the level of trust for the network element. An exemplary traffic mirroring service is described, for example, in U.S. patent application Ser. No. 11/315,674 entitled "METHODS, COMMUNICATION NETWORKS, AND COMPUTER PROGRAM PRODUCTS FOR MIRRORING TRAFFIC ASSOCIATED WITH A NETWORK ELEMENT BASED ON WHETHER THE NETWORK ELEMENT CAN BE TRUSTED," the disclosure of which is hereby incorporated herein by reference.

An exemplary API for the traffic mirroring service may include, but is not limited to, parameters related to permanency of the mirroring, i.e., for how long should the mirroring operations take place, whether the full traffic or only traffic samples are mirrored, and network information for the traffic to be mirrored, such as source IP address, port, and/or protocol information, e.g., VLAN/VPN, ATM PVC, frame relay, and/or MPLS label switched path. Similar parameters may be included for the mirror output, such as port, VLAN/VPN, ATM PVC, frame relay, and/or MPLS label switched path protocol information. FIG. 4 illustrates an exemplary API for the traffic mirroring service in accordance with some embodiments of the present invention.

Traffic monitoring, examination, and/or blocking services, for example, may determine what aspects of traffic associated with a network element should be monitored, examined, and/or blocked and in what manner. Exemplary traffic monitoring, examination, and/or blocking services are described, for example, in U.S. patent application Ser. No. 11/315,864 entitled "METHODS, COMMUNICATION NETWORKS, AND COMPUTER PROGRAM PRODUCTS FOR MONITORING, EXAMINING, AND/OR BLOCKING TRAFFIC ASSOCIATED WITH A NETWORK ELEMENT BASED ON WHETHER THE NETWORK ELEMENT CAN BE TRUSTED," the disclosure of which is hereby incorporated herein by reference.

An exemplary API for the traffic monitoring, examination, and/or blocking service may include, but is not limited to, parameters related to location/site for performance of the traffic monitoring, the type of monitoring/examination performed, e.g., what rules, pattern match sets, and/or deviation from expected value sets are used, the depth of the monitoring/examination performed, e.g., to what level of detail is the traffic monitored/examined, whether blocking is on or off, allowed or not allowed, is temporary or permanent, and what filters are used for blocking traffic. Additional parameters may be included that are related to whether human interaction is on or off, allowed or not allowed, and what events trigger human interaction. Adaptation parameters may be used to identify particular types of adjustments, e.g., adjustments to rules, thresholds used, and the like, and the granularity in the changes that can be made, e.g., units, step sizes, and the like. FIG. 5 illustrates an exemplary API for the traffic monitoring, examination, and/or blocking service in accordance with some embodiments of the present invention.

Traffic storing and/or logging services, for example, may determine what aspects of the traffic associated with the network element (e.g., headers, particular sessions, payloads, etc.) should be stored and/or logged and the particular destinations where the traffic is to be stored and/or logged (e.g., destinations associated with local authorities, FBI, Homeland Security, etc.) based on the level of trust for the network element. Exemplary traffic storing and/or logging services are described, for example, in U.S. patent application Ser. No. 11/315,572 entitled "METHODS, COMMUNICATION NETWORKS, AND COMPUTER PROGRAM PRODUCTS FOR STORING AND/OR LOGGING TRAFFIC ASSOCIATED WITH A NETWORK ELEMENT BASED ON WHETHER THE NETWORK ELEMENT CAN BE TRUSTED," the disclosure of which is hereby incorporated herein by reference.

An exemplary API for the traffic storing and/or logging service may include, but is not limited to, parameters related to whether the full traffic or only traffic samples are stored/logged, network information on the traffic to be stored/logged, e.g., source IP address, destination IP address, port, protocol, and the like, network information related to the storage/logging location, e.g., port, labeled path information, VPN information, VLAN information, and/or destination IP address, and/or information related to data security, such as whether encryption is on/off, encryption techniques used, and/or encryption key information. FIG. 6 illustrates an exemplary API for the traffic storing and/or logging service in accordance with some embodiments of the present invention.

Endpoint and/or midpoint resource selection services for traffic associated with a network element, for example, may allow an endpoint and/or a midpoint path resource to be selected for the traffic so as to force the traffic to a desired traffic endpoint and/or through a desired traffic midpoint such that an untrustworthy network element may be avoided. Exemplary endpoint and/or midpoint resource selection services are described, for example, in U.S. patent application Ser. No. 11/315,618 entitled "METHODS, COMMUNICATION NETWORKS, AND COMPUTER PROGRAM PRODUCTS FOR SELECTING AN ENDPOINT AND/OR A MIDPOINT PATH RESOURCE FOR TRAFFIC ASSOCIATED WITH A NETWORK ELEMENT BASED ON WHETHER THE NETWORK ELEMENT CAN BE TRUSTED," the disclosure of which is hereby incorporated herein by reference.

An exemplary API for the endpoint and/or midpoint resource selection service may include, but is not limited to, parameters related to the particular resource selected, i.e., endpoint, midpoint, or both, the method for selecting the resource, e.g., whether the resource is requested or is assigned as an endpoint/midpoint resource, network information associated with the traffic, e.g., source IP address, destination IP address, port, protocol, and the like, and/or protocol information, such as VLAN/VPN, ATM PVC, frame relay, and/or MPLS label switched path information. Parameters may also be included related to the endpoint/midpoint node, such as port, VLAN/VPN, ATM PVC, frame relay, and/or MPLS label switched path information, IP address, and/or node number. Parameters may be included related to detection avoidance, i.e., whether re-rerouting of traffic is transparent. Such parameters may include whether detection avoidance is on/off, latency/delay used, and/or address spoofing information. FIG. 7 illustrates an exemplary API for the endpoint and/or midpoint resource selection service in accordance with some embodiments of the present invention.

A tunneling service for traffic associated with a network element, for example, may allow a secure tunnel to be configured to convey vulnerable communications through or past an untrustworthy network element. The tunnel may be configured with a degree of data protection that is proportional to the degree to which the network element cannot be trusted. In this way, vulnerable data may be protected from undesirable potential hacking. An exemplary tunneling service is described, for example, in U.S. patent application Ser. No. 11/316,429 entitled "METHODS, COMMUNICATION NETWORKS, AND COMPUTER PROGRAM PRODUCTS FOR CONFIGURING A COMMUNICATION TUNNEL FOR TRAFFIC BASED ON WHETHER A NETWORK ELEMENT CAN BE TRUSTED," the disclosure of which is hereby incorporated herein by reference.

An exemplary API for the tunneling service may include, but is not limited to, parameters related to the tunnel type, e.g., IPsec, SSL, MPLS, frame relay, ATM, VLAN, security mechanisms used, e.g., authentication, encryption, message signing, message integrity protection, security methods, algorithms, and key information, information on tunnel endpoints, e.g., identification of tunnel initiator and tunnel end, tunnel monitoring information, e.g., monitoring methods and monitoring frequency, filter information for tunnel traffic, e.g., source/destination IP address, ports, protocol for traffic to block and to route through tunnel. FIG. 8 illustrates an exemplary API for the tunneling service in accordance with some embodiments of the present invention.

An application management service for a network element, for example, may determine whether a network element in a communication path can be trusted and/or to what degree the network element can be trusted. Based on this determination, a separate determination can be made to identify potential network elements that may be vulnerable to attack or degradation of service, for example, due to the presence of one or more untrustworthy elements. An application may be identified on a vulnerable network element for which a command may be sent to reduce the vulnerability of the network element. An exemplary application management service is described, for example, in U.S. patent application Ser. No. 11/315,917 entitled "METHODS, COMMUNICATION NETWORKS, AND COMPUTER PROGRAM PRODUCTS FOR MANAGING APPLICATION(S) ON A VULNERABLE NETWORK ELEMENT DUE TO AN UNTRUSTWORTHY NETWORK ELEMENT BY SENDING A COMMAND TO AN APPLICATION TO REDUCE THE VULNERABILITY OF THE NETWORK ELEMENT," the disclosure of which is hereby incorporated herein by reference.

An exemplary API for the application management service may include, but is not limited to, parameters related to the identity of the particular application to control, e.g., firewall, anti-virus/spy-ware/spam, operating system, email/instant messaging, peer-to-peer application, shared application, game, a variable associated with the application and a value associated with the variable, whether the value is an absolute value or a relative value, and/or a query parameter for a controllable application, controllable value, and/or value associated with the controllable value. FIG. 9 illustrates an exemplary API for the application management service in accordance with some embodiments of the present invention.

As discussed above, the API request may be used to set up an ongoing function on one or more resources in the communication network that may continue until the API is used to terminate the function. In these embodiments, the exemplary APIs described above for the various trust-controlled services may further include parameters related to degree of trust and/or trusted/not trusted, along with parameters related to completion of the set-up and modifying the set up. Start and stop parameters may also be included.

Although FIG. 1 illustrates an exemplary communication network, it will be understood that the present invention is not limited to such configurations, but is intended to encompass any configuration capable of carrying out the operations described herein.

The verification system 110, resource manager 120, network/application controller 125, and/or requesting application 130 may be embodied as one or more data processing systems that comprise, for example, input device(s), such as a keyboard or keypad, a display, and a memory that communicate with a processor. Such data processing system(s) may further include a storage system, a speaker, and an input/output (I/O) data port(s) that also communicate with the processor. The storage system may include removable and/or fixed media, such as floppy disks, ZIP drives, hard disks, or the like, as well as virtual storage, such as a RAMDISK. The I/O data port(s) may be used to transfer information between the data processing system(s) and another computer system or a network (e.g., the Internet). These components may be conventional components such as those used in many conventional computing devices, which may be configured to operate as described herein. Moreover, the functionality of the verification system 110, resource manager 120, network/application controller 125, and/or requesting application 130 may be implemented as a single processor system, a multi-processor system, or even a network of stand-alone computer systems, in accordance with various embodiments of the present invention.

Computer program code for carrying out operations of the verification system 110, resource manager 120, network/application controller 125, and/or requesting application 130 may be written in a high-level programming language, such as C or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

The flowcharts of FIGS. 2-3 illustrate the architecture, functionality, and operations of some embodiments of APIs for trust-based services. In this regard, each block represents a module, segment, or portion of code, which comprises one or more executable instructions for implementing the specified logical function(s). It should also be noted that in other implementations, the function(s) noted in the blocks may occur out of the order noted in FIGS. 2-3. For example, two blocks shown in succession may, in fact, be executed substantially concurrently or the blocks may sometimes be executed in the reverse order, depending on the functionality involved.

Many variations and modifications can be made to the embodiments described herein without substantially departing from the principles of the present invention. All such variations and modifications are intended to be included herein within the scope of the present invention, as set forth in the following claims.

That which is claimed:

1. A method, comprising:
   comparing first data associated with a network element in a communication network that has access to the communication network with second data associated with the network element;
   obtaining a trust evaluation for the network element based on the comparison of the first data with the second data;
   invoking a service in response to the trust evaluation for the network element via an application programming interface associated with the service;
   verifying a result of invoking the service; and
   logging the result in an information repository;
   wherein comparing the first data with the second data comprises:
   generating a first hash value based on the first data associated with the network element at a first time;
   generating a second hash value based on the second data associated with the network element at a second time; and
   comparing the first hash value with the second hash value to determine whether a change has occurred in the configuration of the network element between the first time and the second time.

2. The method of claim 1, wherein invoking the service comprises: invoking the service via the application programming interface associated with the service to directly perform a function on a resource in the communication network.

3. The method of claim 1, wherein invoking the service comprises: invoking the service via the application programming interface associated with the service to set up an ongoing function on a resource in the communication network.

4. The method of claim 1, wherein the service comprises a traffic mirroring service for the network element, a traffic monitoring service for the network element, a traffic examination service for traffic associated with the network element, a traffic blocking service for traffic associated with the network element, a traffic storage service for traffic associated with the network element, a traffic logging service for traffic associated with the network element, an endpoint resource selection service for traffic associated with the network element, a midpoint selection service for traffic associated with the network element, a tunneling service for traffic associated with the network element, and an application management service for the network element.

5. The method of claim 4, wherein the service comprises the traffic mirroring service, and wherein the application programming interface associated with the traffic mirroring service comprises one of the following parameters: mirroring permanency, mirror full traffic, mirror sample traffic, traffic source IP address, traffic port, traffic protocol, mirror output port, mirror output protocol, trust degree, trusted, not-trusted, set-up complete, modify set-up, start service, and stop service.

6. The method of claim 4, wherein the service comprises the traffic monitoring service, traffic examination service, and traffic blocking service for the network element, and wherein the application programming interface associated with the traffic monitoring service, traffic examination service, and traffic blocking service for the network element comprises one of the following parameters: monitoring location, type of monitoring, type of examination, depth of monitoring, depth of examination, blocking status, blocking traffic filter, human interaction indication, adaptation information, trust degree, trusted, not-trusted, set-up complete, modify set-up, start service, and stop service.

7. The method of claim 4, wherein the service comprises the traffic storage service and the traffic logging service for traffic associated with the network element, and wherein the application programming interface associated with the traffic storage service and the traffic logging service for traffic associated with the network element comprises one of the following parameters: store full traffic, store traffic samples, traffic source IP address, traffic destination IP address, traffic port, traffic protocol, storing location, port associated with the location, protocol associated with the location, encryption information, trust degree, trusted, not-trusted, set-up complete, modify set-up, start service, and stop service.

8. The method of claim 4, wherein the service comprises the endpoint resource selection service and the midpoint selection service for traffic associated with the network element, and wherein the application programming interface associated with the endpoint resource selection service and the midpoint selection service for traffic associated with the network element comprises one of the following parameters: endpoint identification, midpoint identification, request for midpoint, request for endpoint, assign midpoint, assign endpoint, traffic source IP address, traffic destination IP address, traffic port, traffic protocol, midpoint port, endpoint port, midpoint protocol, endpoint protocol, midpoint node number, endpoint node number, detection avoidance information, trust degree, trusted, not-trusted, set-up complete, modify set-up, start service, and stop service.

9. The method of claim 4, wherein the service comprises the tunneling service for traffic associated with the network element, and wherein the application programming interface associated with the tunneling service for traffic associated with the network element comprises one of the following parameters: tunnel type, security information, endpoint identification, monitoring method information, traffic filter information for the tunnel, trust degree, trusted, not-trusted, set-up complete, modify set-up, start service, and stop service.

10. The method of claim 4, wherein the service comprises the application management service for the network element, and wherein the application programming interface associated with the application management service for the network element comprises one of the following parameters: application identity, variable associated with the application, value associated with the variable, application query, variable query, value query, trust degree, trusted, not-trusted, set-up complete, modify set-up, start service, and stop service.

11. The method of claim 1, further comprising:
determining whether to invoke an alert based on the verification of the result.

12. A system, comprising:
a processor;
a memory coupled to the processor and having computer executable code stored on the memory that when executed by the processor causes the processor to perform operations comprising:
comparing first data associated with a network element in a communication network that has access to the communication network with second data associated with the network element;
obtaining a trust evaluation for the network element based on the comparison of the first data with the second data;
invoking a service in response to the trust evaluation for the network element via an application programming interface associated with the service;
verifying a result of invoking the service; and
logging the result in an information repository;
wherein comparing the first data with the second data comprises:
generating a first hash value based on the first data associated with the network element at a first time;
generating a second hash value based on the second data associated with the network element at a second time; and
comparing the first hash value with the second hash value to determine whether a change has occurred in the configuration of the network element between the first time and the second time.

13. The system of claim 12, wherein invoking the service comprises: invoking the service via the application programming interface associated with the service to directly perform a function on a resource in the communication network.

14. The system of claim 12, wherein invoking the service comprises: invoking the service via the application programming interface associated with the service to set up an ongoing function on a resource in the communication network.

15. The system of claim 12, wherein the service comprises a traffic mirroring service for the network element, a traffic monitoring service for the network element, a traffic examination service for traffic associated with the network element, a traffic blocking service for traffic associated with the network element, a traffic storage service for traffic associated with the network element, a traffic logging service for traffic associated with the network element, an endpoint resource selection service for traffic associated with the network element, a midpoint selection service for traffic associated with the network element, a tunneling service for traffic associated with the network element, and an application management service for the network element.

16. The system of claim 12, wherein the operations further comprise:
determining whether to invoke an alert based on the verification of the result.

17. A computer program product, comprising:
a tangible computer readable medium comprising computer readable program code stored on the computer readable medium that when, executed by a processor causes the processor to perform operations comprising:
comparing first data associated with a network element in a communication network that has access to the communication network with second data associated with the network element;
obtaining a trust evaluation for the network element based on the comparison of the first data with the second data;
invoking a service in response to the trust evaluation for the network element via an application programming interface associated with the service;
verifying a result of invoking the service; and
logging the result in an information repository;
wherein comparing the first data with the second data comprises:
generating a first hash value based on the first data associated with the network element at a first time;
generating a second hash value based on the second data associated with the network element at a second time; and
comparing the first hash value with the second hash value to determine whether a change has occurred in the configuration of the network element between the first time and the second time.

18. The computer program product of claim 17, wherein invoking the service comprises:
invoking the service via the application programming interface associated with the service to directly perform a function on a resource in the communication network.

19. The computer program product of claim 17, wherein invoking the service comprises:
invoking the service via the application programming interface associated with the service to set up an ongoing function on a resource in the communication network.

20. The computer program product of claim 17, wherein the service comprises a traffic mirroring service for the network element, a traffic monitoring service for the network element, a traffic examination service for traffic associated with the network element, a traffic blocking service for traffic associated with the network element, a traffic storage service for traffic associated with the network element, a traffic logging service for traffic associated with the network element, an endpoint resource selection service for traffic associated with the network element, a midpoint selection service for traffic associated with the network element, a tunneling service for traffic associated with the network element, and an application management service for the network element.

* * * * *